US012760967B2

(12) United States Patent
Zhu et al.

(10) Patent No.: US 12,760,967 B2
(45) Date of Patent: Oct. 13, 2026

(54) LASER DRYING DEVICE AND METHOD OF USE THEREOF

(71) Applicant: KATOP Automation Co., Ltd., Shenzhen City (CN)

(72) Inventors: Gaowen Zhu, Shenzhen City (CN); Saiqiang Yang, Shenzhen City (CN); Xipeng Huang, Shenzhen City (CN); Zhixing He, Shenzhen City (CN); Weiquan Mo, Shenzhen City (CN)

(73) Assignee: KATOP Automation Co., Ltd., Shenzhen City (CN)

( * ) Notice: Subject to any disclaimer, the term of this patent is extended or adjusted under 35 U.S.C. 154(b) by 343 days.

(21) Appl. No.: 18/671,849

(22) Filed: May 22, 2024

(65) Prior Publication Data

US 2025/0003680 A1 Jan. 2, 2025

(30) Foreign Application Priority Data

Jun. 30, 2023 (CN) ......................... 202310802459.2

(51) Int. Cl.
*F26B 3/28* (2006.01)
*B23K 26/352* (2014.01)
*B23K 26/70* (2014.01)

(52) U.S. Cl.
CPC .............. *F26B 3/28* (2013.01); *B23K 26/352* (2015.10); *B23K 26/702* (2015.10)

(58) Field of Classification Search
CPC ........ F26B 3/28; F26B 13/007; F26B 13/008; F26B 13/12; F26B 25/22; B23K 26/352; B23K 26/702; B05D 3/0254; B05D 3/06; H01M 4/0471
See application file for complete search history.

(56) References Cited

U.S. PATENT DOCUMENTS 5,517,768 A * 5/1996 Aviv .......................... F26B 3/28 427/510
11,000,918 B2 * 5/2021 Idaka ................... B23K 26/032
2022/0009124 A1 * 1/2022 Xiao ....................... B23K 26/34
2022/0209212 A1 * 6/2022 Hirukawa ......... H01M 10/0525

* cited by examiner

*Primary Examiner* — David J Laux
(74) *Attorney, Agent, or Firm* — Inskeep IP Group, Inc.

(57) ABSTRACT

Disclosed is a laser drying device and a laser drying method, and relates to the technical field of coating. The laser drying device includes a laser drying module, a position sensor, a sensor module and a control system; the laser drying module includes semiconductor laser units arranged in an array and electrically connected to the control system; the sensor module includes a sensor and a sensor driving unit, wherein the sensor is slidably connected to the sensor driving unit, the sensor driving unit is positioned on a side of the laser drying module; and the position sensor is placed at an edge of a strip to detect a position of the edge of the strip. The precision of drying is effectively ensured, and the safety of production is also ensured.

8 Claims, 7 Drawing Sheets

LASER DRYING DEVICE AND METHOD OF USE THEREOF

RELATED APPLICATIONS

This application claims priority under 35 U.S.C. § 119(a) to Chinese Patent Application No. 2023108024592, filed on Jun. 30, 2023, which is hereby incorporated by reference herein in its entirety.

TECHNICAL FIELD

The present application relates to the technical field of coating, and in particular, to a laser drying device and method of use thereof.

BACKGROUND OF THE INVENTION

In a production process, after a pole piece or diaphragm is coated, it needs to be dried by an oven, and the existing oven mainly adopts hot air or infrared lamps to achieve the drying effect, but these drying methods can only regulate the heating power for entire surface of the pole piece, and it is difficult to accurately control the heating power for a specific area, which makes it difficult to control drying performance of a specific area. For example, the heating powers required for the thinned area at the edge of the coating, the ceramic area at the edge of the positive electrode coating, and the blank area of the stripe coating are different from those required for the internal of the coating, and applying a same heating power will cause these areas to be dried too quickly or too slowly, resulting in some drying defects.

In addition, solvent NMP of positive electrode slurry is an explosive gas, which will lead to explosion when the concentration is too high and the temperature is too high. And the infrared lamp radiates infrared light through high temperature, so the surface temperature of the lamp is high, and there is a safety hazard when it is used for positive electrode drying.

SUMMARY

In order to overcome the deficiencies of the existing technology, the present disclosure provides a laser drying method and device, which solves the problems of the current drying area not being able to be precisely controlled and the high temperature of the infrared light causing safety risks, and effectively ensures both the precision of drying and the safety of production.

The technical solution adopted by the present application to solve its technical problems is to provide a laser drying device including a laser drying module, a position sensor, a sensor module and a control system;

- the laser drying module includes semiconductor laser units arranged in an array and electrically connected to the control system;
- the sensor module includes a sensor and a sensor driving unit, wherein the sensor is slidably connected to the sensor driving unit, the sensor driving unit is positioned on a side of the laser drying module; and
- the position sensor is placed at an edge of a strip to detect a position of the edge of the strip.

In some embodiments, the laser drying module further includes a heat dissipation duct, laser cable ducts, a quartz glass plate and a housing, and wherein the heat dissipation duct is arranged on a surface of the housing distal to a coating, the quartz glass plate is arranged on a surface of the housing proximate to the coating, and the laser cable ducts are arranged around the heat dissipation duct.

In some embodiments, the semiconductor laser units are provided between the quartz glass plate and the housing.

In some embodiments, the sensor driving unit includes a sliding guide and a driving motor, wherein the sliding guide is slidably connected to the sensor and placed on one side of the laser drying module, the driving motor is mounted on one end of the sliding guide and is kinetically connected to the sliding guide.

In some embodiments, the sliding guide includes a chain, a slide groove, a first transmission gear and a second transmission gear, the chain is arranged around the slide groove, and the chain is connected to the first transmission gear at an end and connected to the second transmission gear at the other end; a T-shape slider is provided at a connection point of the sliding guide and the sensor, and an horizontal end of the T-shape slider is arranged between the slide groove and a side of the chain away from the laser drying module; and the first transmission gear is kinetically connected to an output shaft of the drive motor.

A laser drying method applied to the above laser drying device is provided, wherein the laser drying method comprises:

- S10: establishing a coordinate system, and numbering each semiconductor laser unit of the laser drying module;
- S20: establishing mapping relationships between each area of a pole piece and each semiconductor laser unit;
- S30: collecting drying performance of different areas of the pole piece by the sensor module, and transmitting them to the control system;
- S40: calculating difference between the drying performance of the different areas of the pole piece and the desired drying performance, and calculating the adjustment amount of the semiconductor laser unit for each area by a closed-loop control algorithm;
- S50: seeking the number of the semiconductor laser unit in each area, via the control system, based on the mapping relationships between the different areas of the pole piece and the semiconductor laser units, and introducing the adjustment amount of the semiconductor laser unit for each area to the semiconductor laser unit with the number, to adjust output power of each semiconductor laser unit;
- S60, repeating S30-S50 to achieve segmented closed-loop control of the pole piece.

In some embodiments, in S10, the numbering is performed by: taking an axis of the laser drying module as a starting point in an X direction, and taking an upper edge or a lower edge of the laser drying module as a starting point in a Y direction for numbering each semiconductor laser unit.

In some embodiments, in S20, establishing the mapping relationships by: establishing a right-angle coordinate system with an axis of the pole piece as X-axis, and with an upper edge or a lower edge of the pole piece as Y-axis, and inputting width ranges of each area of the pole piece; in the case that the axis of the pole piece is aligned with a normal of an emitting area of the laser drying module, obtaining the mapping relationships between different areas of the pole piece and the semiconductor laser units based on dimensions of light spots of the semiconductor laser units and widths of different areas of the pole piece.

In some embodiments, the laser drying method further comprises a step, before S40, of correcting the mapping relationships between each area of the pole piece and each semiconductor laser unit according to the offset of the pole piece measured by the position sensor.

In some embodiments, the closed-loop control algorithm is a closed-loop control algorithm of PID.

The beneficial effect of the present application is: the present solution detects the drying degree of different areas of the coating through sensors, and controls the laser drying module to dry the areas of the coating that need to be dried through the control system, so as to realize accurate drying of the coating, and in addition, dissipates the heat of the semiconductor laser unit through the heat dissipation pipeline as well as regulates the output power of the semiconductor laser unit through the control system, so as to prevent the semiconductor laser unit from having an overly high temperature. Therefore, the precision of drying is effectively ensured, and the safety of production is also ensured.

DETAILED DESCRIPTION

The present application will be further described below in conjunction with the accompanying drawings and embodiments.

The conception, specific structure and technical effects of the present application will be obvious according to embodiments and accompanying drawings. It should be appreciated that the described embodiments are only some embodiments of the present application, and based on the embodiments of the present application, the other embodiments obtained by the skilled person in the art without creative labor will fall into the scope of protection of the present application. In addition, all coupling/connection relationships involved in this application refer to direct connection of the members and indirect connection of the members in which a coupling auxiliary part is used to provide a more optimal coupling structure. The various technical features in the present application can be combined interactively without contradicting or conflicting with each other.

Figure 1:
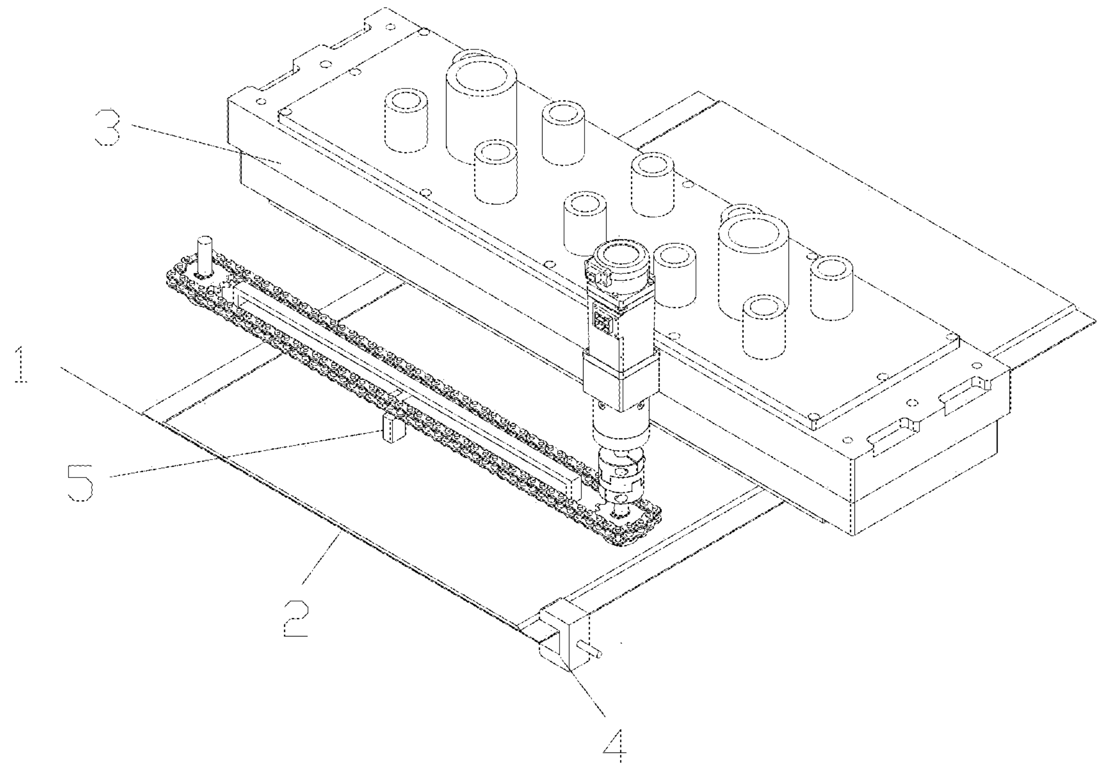
FIG. 1 shows a first view of an overall structure of a laser drying device.
Figure 2:
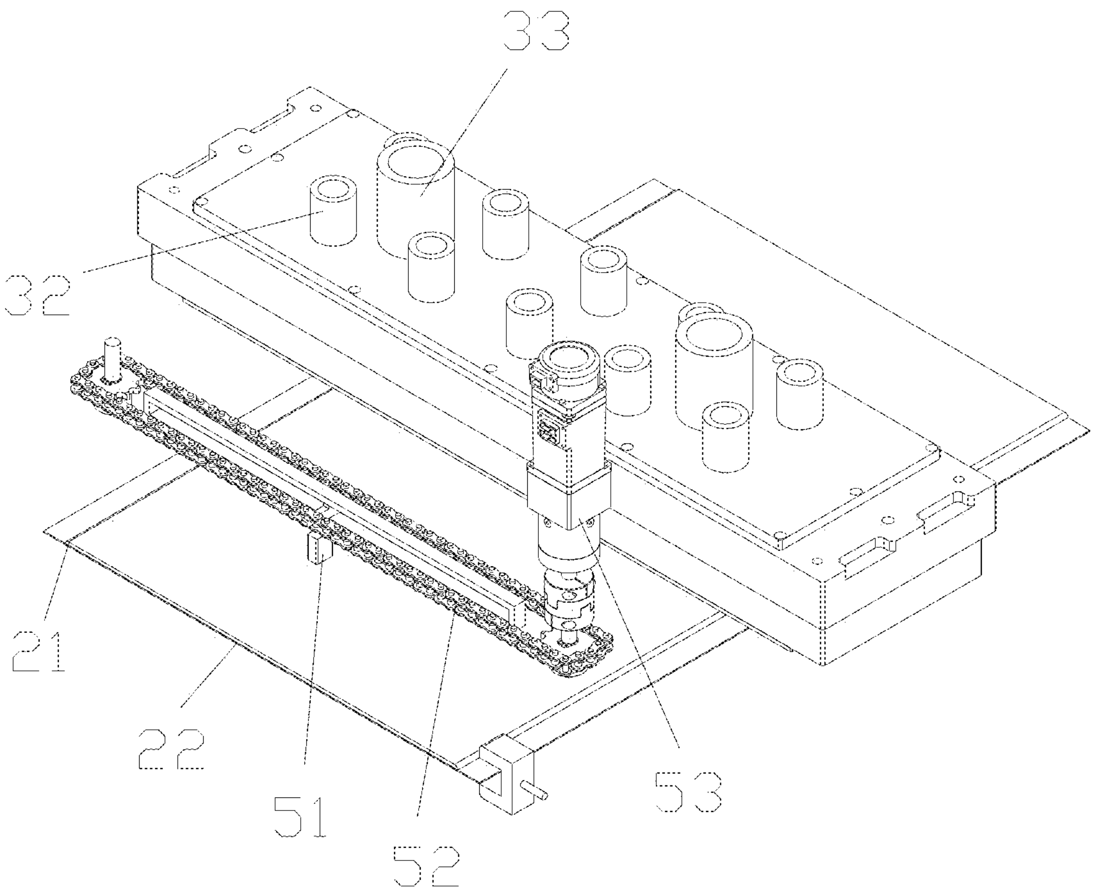
FIG. 2 shows a second view of the overall structure of a laser drying device.
Figure 3:
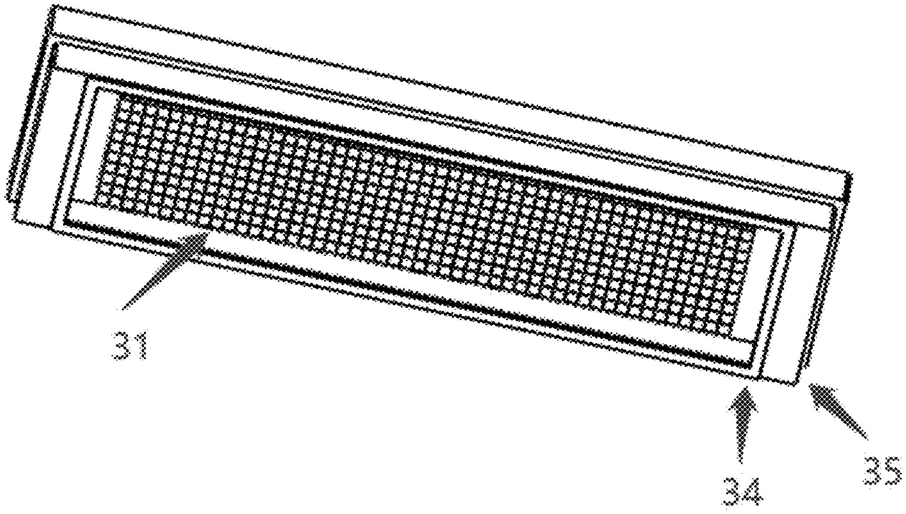
FIG. 3 shows a schematic diagram of a laser drying module of a laser drying device.
Figure 4:
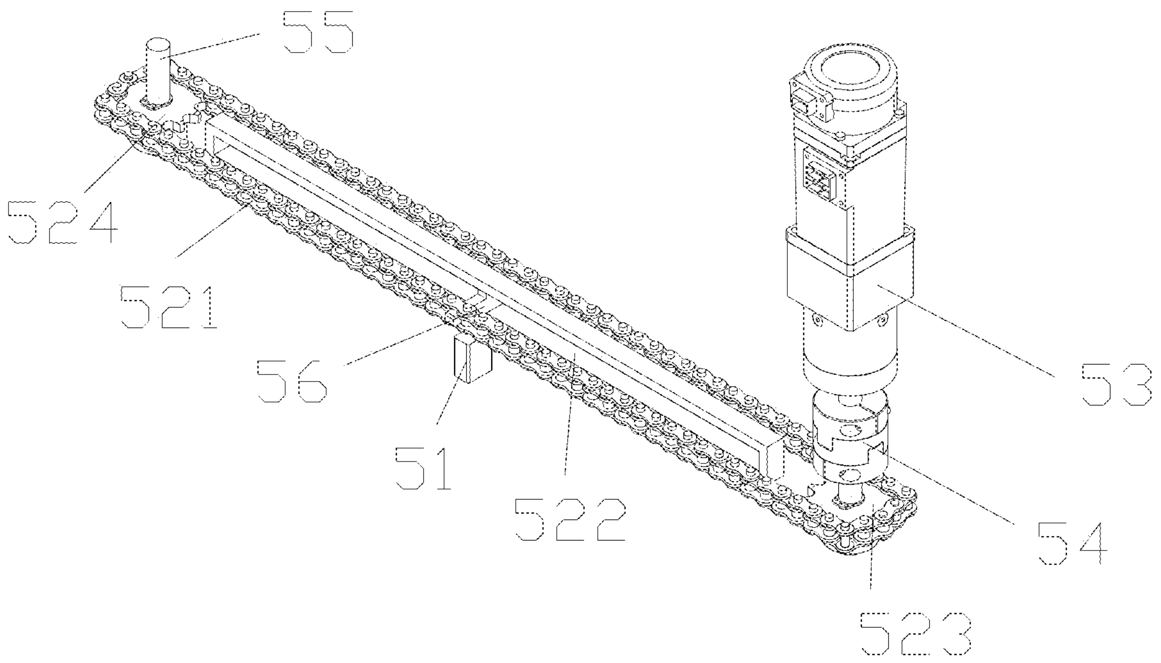
FIG. 4 shows a schematic diagram of a sensor module of a laser drying device.
Figure 5:
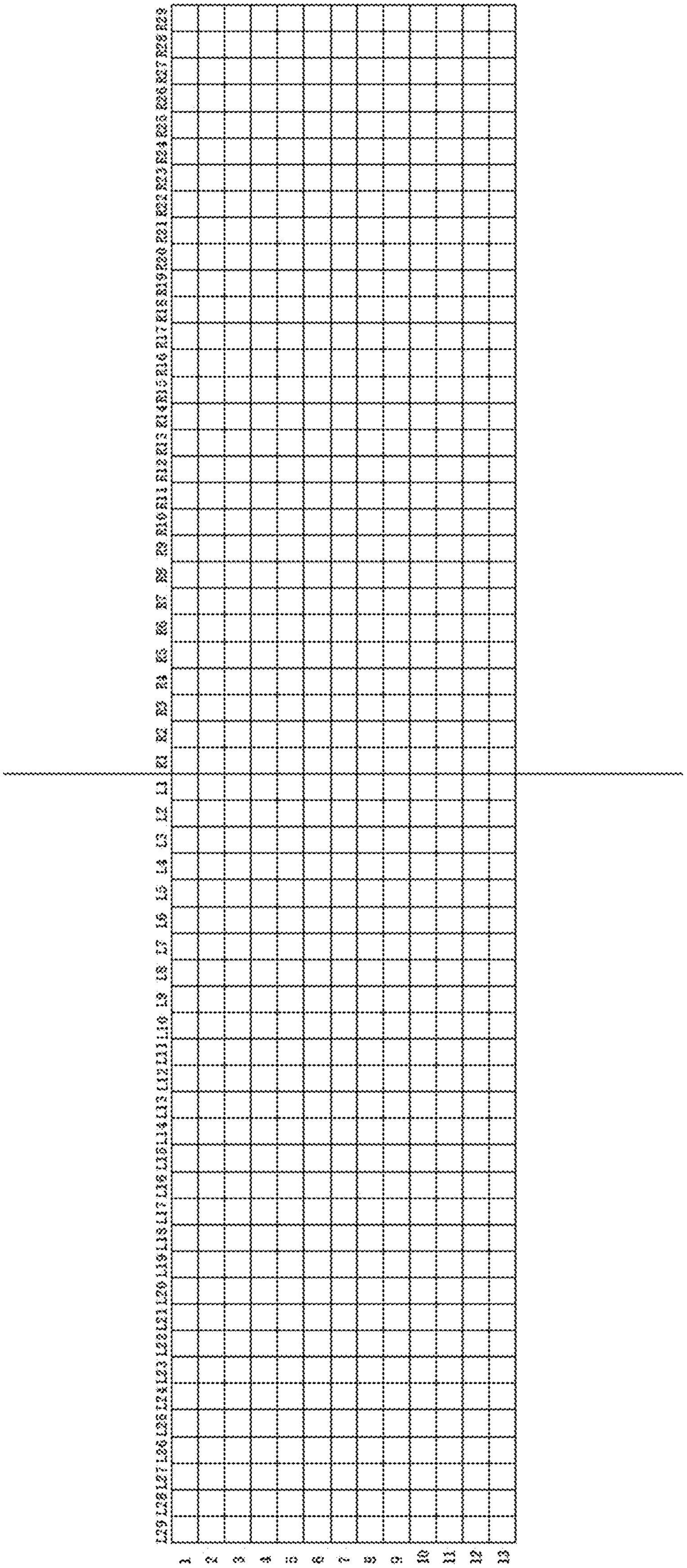
FIG. 5 shows a first view of a semiconductor laser unit of a laser drying device.
Figure 6:
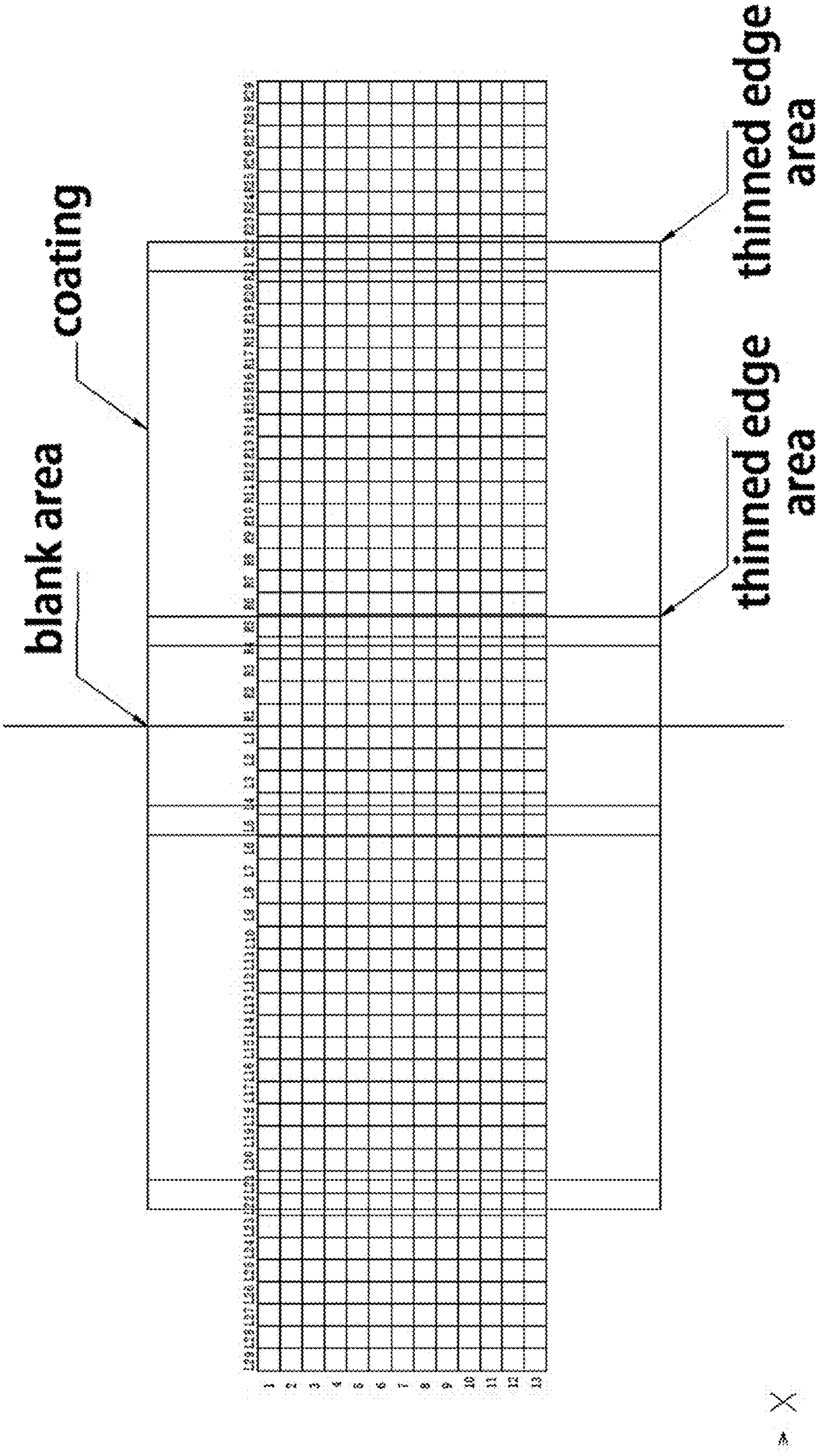
FIG. 6 shows a second view of a semiconductor laser unit of a laser drying device.
Figure 7:
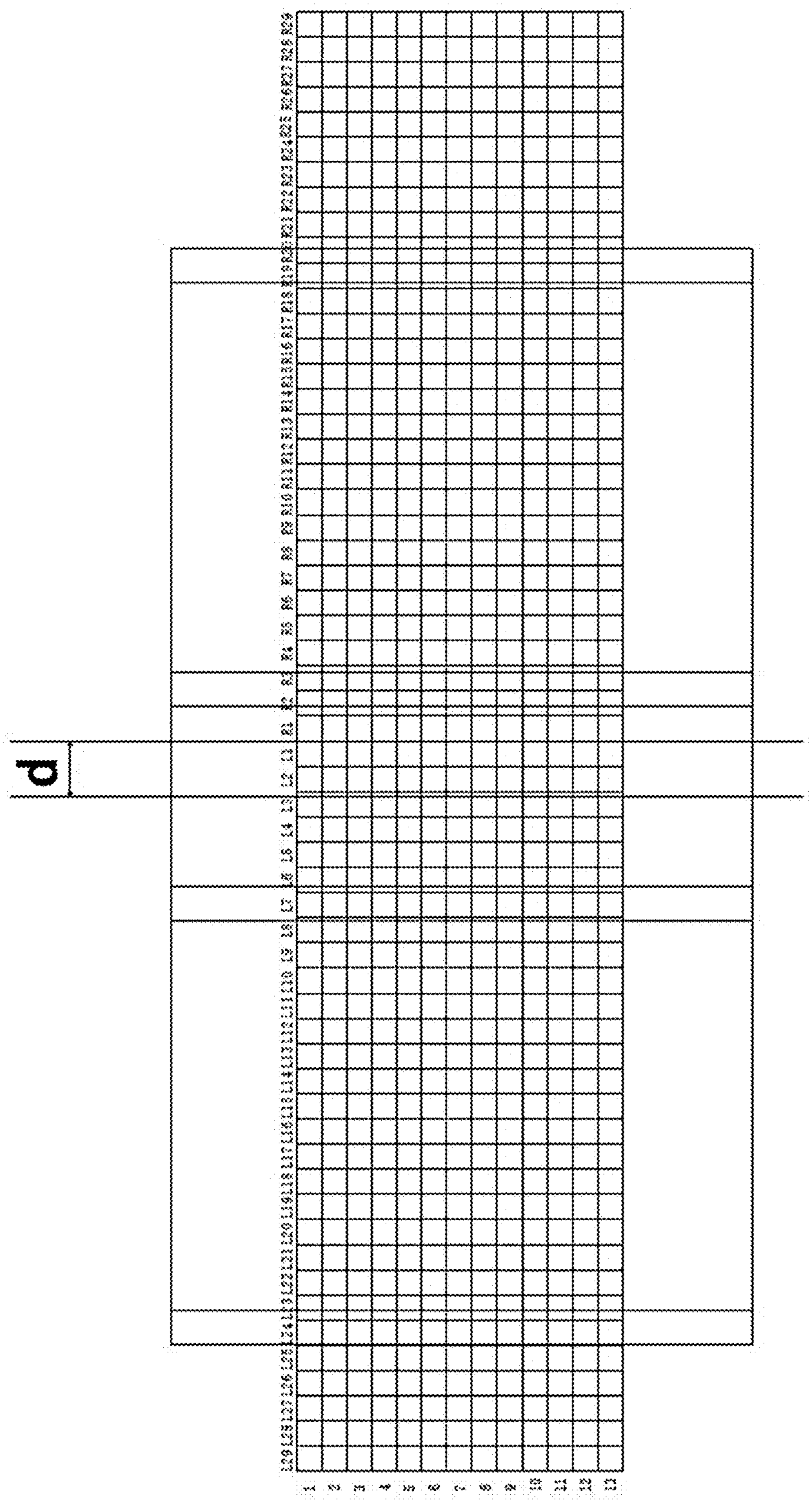
FIG. 7 shows a third view of a semiconductor laser unit of a laser drying device.
Figure 8:
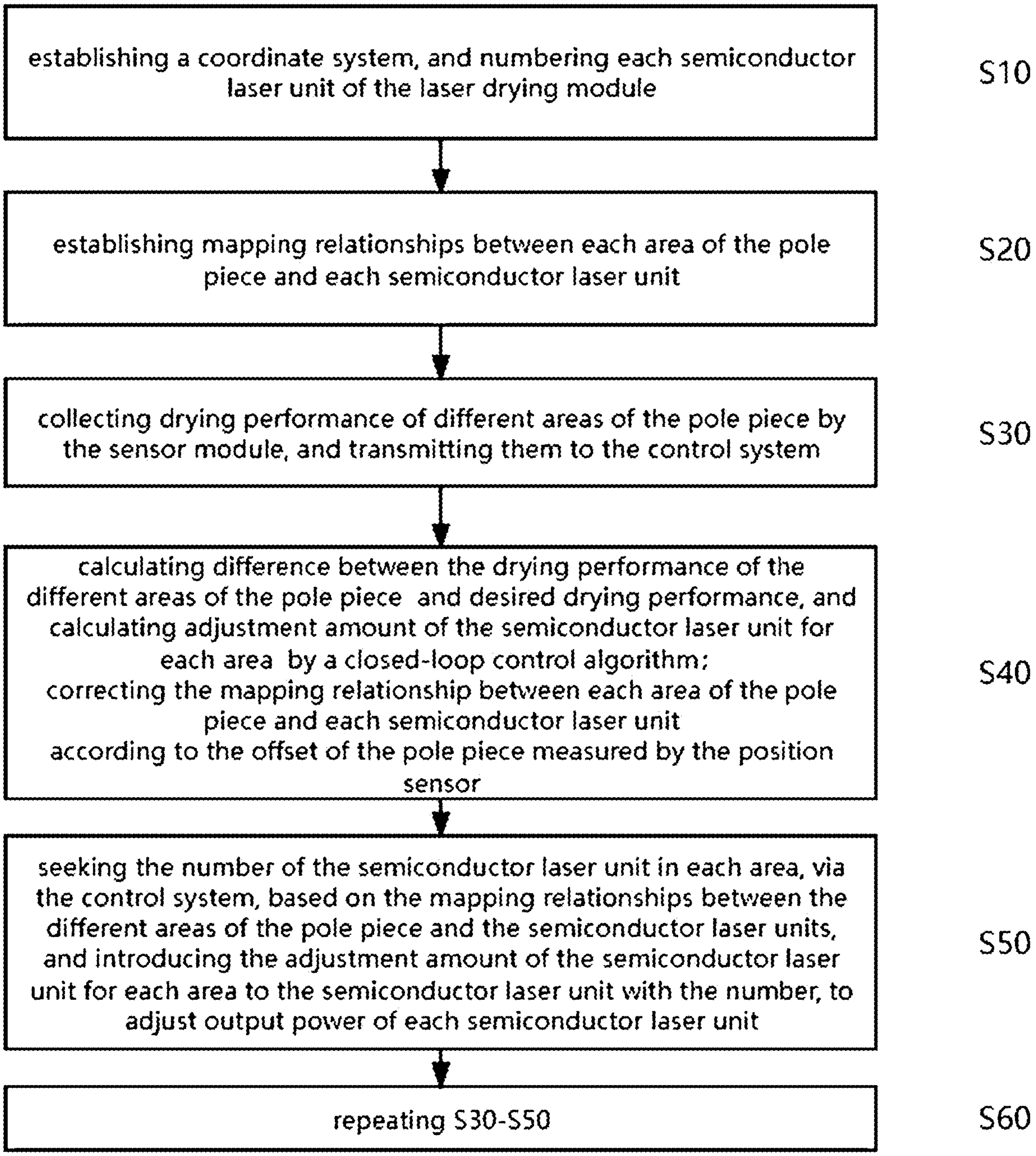
FIG. 8 shows a flow chart of a laser drying method.

A laser drying device is shown in FIGS. 1-3. The laser drying device includes a laser drying module 3, a position sensor 4, a sensor module 5 and a control system. The laser drying module 3 includes semiconductor laser units 31, laser cable ducts 32, a heat dissipation duct 33, a quartz glass plate 34 and a housing 35. The semiconductor laser units 31 are arranged in an array and electrically connected to the control system. The heat dissipation duct 33 is arranged on a surface of the housing 35 distal to a coating 2, the quartz glass plate 34 is arranged on a surface of the housing 35 proximate to a coating 2, and the semiconductor laser units 31 are provided between the quartz glass plate 34 and the housing 35. The laser cable ducts 32 are arranged around the heat dissipation duct 33. The sensor module 5 includes a sensor 51 and a sensor driving unit, wherein the sensor 51 is slidably connected to the sensor driving unit. The sensor driving unit is positioned on a side of the laser drying module 3. The position sensor 4 is placed at an edge of a strip 1 to detect a position of the edge of the strip 1.

In the laser drying device according to some embodiments, the sensor 51 detects a humidity of different areas of the coating 2 by driving the sensor 51 to slide on a guide rail 52, via a motor 53, and transmits a signal to the control system. The sensor 51 may detect temperature or humidity at different positions of the pole piece to determine drying performance of different areas of the pole piece and thus the drying speed. The sensor 51 may be a temperature sensor 51 or a humidity sensor 51. The temperature sensor 51 can be configured as an infrared thermometer or a thermal imaging camera, and the humidity sensor 51 is preferably an inductive moisture meter, such as near-infrared moisture meter or microwave moisture meter. The control system controls the semiconductor laser units 31 to precisely dry the coating 2 according to the drying performance of different areas of the coating 2. Specially, the semiconductor laser units 31 are energized to radiate infrared light, through the quartz glass plate 34, to dry the coating 2. The quartz glass plate 34 is configured to seal the semiconductor laser units 31 to prevent the laser from being corroded and damaged by vapors caused by drying. In addition, the laser cable ducts 32 serve as ducts for arranging wires to connect the semiconductor laser units 31 to the control system. The heat dissipation duct 33 dissipates heat from the semiconductor laser units 31 to control the temperature of the semiconductor laser units 31 to ensure production safety. The pole piece may be deviated during the drying process, resulting in a deviation between actual position and expected position of irradiation of each semiconductor laser unit 31 of the laser, the position sensor 4 is set on one side of the laser drying module 3, the position sensor 4 detects the position of the coating 2 and transmits a position signal to the control system. If the pole piece is deviated, the control system can adjust mapping relationship between each semiconductor laser unit 31 and actual area of the pole piece. In addition, the coating 2 is a negative electrode paste coated on the substrate 1, wherein the coating 2 includes at least a thinned edge area and an interior area, the thinned edge area is thinner than the interior area. In some embodiments, the coating 2 may also include a ceramic paste edge area or a blank area.

Referring to FIG. 3, the sensor driving unit includes a sliding guide 52 and a driving motor 53, wherein the sliding guide 52 is slidably connected to the sensor 51 and placed on one side of the laser drying module 3. The driving motor 53 is mounted on one end of the sliding guide 52 and is kinetically connected to the sliding guide 52 including a chain 521, a slide groove 522, a first transmission gear 523 and a second transmission gear 524, the chain 521 is arranged around the slide groove 522. The chain 521 is connected to the first transmission gear 523 at an end and connected to the second transmission gear 524 at the other end. A T-shape slider 56 is provided at a connection point of the sliding guide 52 and the sensor 51, and an horizontal end of the T-shape slider 56 is arranged between the slide groove 522 and a side of the chain 521 away from the laser drying module 3. The first transmission gear 523 is kinetically connected to an output shaft of the drive motor 53. The sensor module 5 further includes a coupling 54 and a transmission rotary shaft 55, wherein the coupling 54 is rotatably connected to the output shaft of the drive motor, the first transmission gear 523 is rotatably connected to the coupling 54 and located at an end of the chain 521, and the second transmission gear 524 is located at the other end of the chain 521 and sleeved on the transmission rotary shaft 55. The first transmission gear 523 and the coupling are sleeved on the output shaft of the drive motor 53 to allow coaxial rotation. The first transmission gear 523 and the second transmission gear 524 engage the chain 521. The drive motor 53 drives the chain 521 to rotate, and the chain 521 drives the sensor 51 to slide along the slide groove 522 to detect the drying performance of the coating 2 at different locations, wherein the coupling 54, the first transmission gear 523, and the second transmission gear 524 serve as transmission components of the drive motor 53 to drive the chain 521 to rotate.

Referring to FIGS. 1-8, the present application also provides a laser drying method applied to the laser drying device described in the above embodiments. The laser drying method includes:

S10: establishing a coordinate system, and numbering each semiconductor laser unit 31 of the laser drying module 3, wherein the numbering method is as follows: taking an axis of the laser drying module 3 as a starting point in an X direction, and taking an upper edge or a lower edge of the laser drying module 3 as a starting point in a Y direction for numbering each semiconductor laser unit 31; in some embodiments, transverse coordinates of a plurality of columns from a center line to the left are L1-L29 in turn, and transverse coordinates of a plurality of columns from the center line to the right are R1-R29 in turn.

S20: establishing a mapping relationship between each area of the pole piece and each semiconductor laser unit 31; the mapping relationship is established by: establishing a right-angle coordinate system with an axis of the pole piece as X-axis, and with an upper edge or a lower edge of the pole piece as Y-axis, and inputting width ranges of each area of the pole piece; in the case that the axis of the pole piece is aligned with a normal of an emitting area of the laser drying module 3, obtaining mapping relationships between different areas of the pole piece and the semiconductor laser units based on dimensions of light spots of the semiconductor laser units and widths of different areas of the pole piece. The laser light has a very small scattering angle, so that it can be considered that the laser light does not scatter when the laser drying module 3 is not far away from the pole piece, and an area of the light spot is regarded as an area of the emitting area of the semiconductor laser unit 31. The correspondence of the area of the pole piece and the semiconductor laser unit can be determined by comparing width and length of the light spot and width and length of the area of the pole piece.

In this embodiment, if the light spots of the semiconductor laser units 31 in columns L1 to L3 and R1 to R3 fall into the blank area, the semiconductor laser units 31 for columns L1 to L3 and R1 to R3 correspond to the blank area of the pole piece. In this embodiment, a semiconductor laser unit 31 that irradiates to two areas of the pole piece is considered to irradiate to an area requiring being dried more, which ensures a wetter area can be dried completely. For example, columns L4 and R4 correspond to the edge thinning areas of the pole piece, and columns L5, R5, L21 and R21 are categorized into the coating 2 area. It is understood that the smaller the spot area of the semiconductor laser unit 31 is, the higher the resolution of the laser drying module 3 is, and the higher the precision of the sub-area drying control of the various areas of the pole piece.

S30, drying performance of different areas of the pole piece is collected by the sensor module 5 and transmitted to the control system.

S40, calculating difference between the drying performance of different areas of the pole piece collected by the sensor module 5 and the desired drying performance, and the adjustment amount of the semiconductor laser unit 31 for each area is calculated by a closed-loop control algorithm; the closed-loop control algorithm is a closed-loop control algorithm of PID and its variants. In addition, when the pole piece runs out of alignment, the mapping relationships between the various areas of the pole piece and the semiconductor laser units 31 are changed, and the initial mapping relationship between the various areas of the pole piece and the semiconductor laser unit 31 needs to be corrected based on the offset of the pole piece obtained by the measurement of the position sensor 4. If the position sensor 4 detects that the pole piece has been shifted to the left by a distance d, the initial width coordinate range of each area of the pole piece is subtracted from d, and then the area into which the light spot coordinates of each semiconductor laser unit 31 fall is determined again to correct the mapping relationship. Since the position of the pole piece relative to the sensor module 5 also changes when the pole plate runs off, the difference should also be calculated according to the position of each area of the pole piece relative to the sensor module 5 after the pole piece running off.

S50, seeking the number of a semiconductor laser unit 31 in each area, via the control system, based on the mapping relationships of the different areas of the pole piece and the semiconductor laser units 31, and introducing the adjustment amount of the semiconductor laser unit 31 for each area to the semiconductor laser unit 31 with the number, to adjust the output power of each semiconductor laser unit 31; when the pole piece runs off, a step before S40 is correcting the mapping relationship between each area of the pole piece and each semiconductor laser unit 31 according to the offset of the pole piece measured by the position sensor 4.

S60, repeating S30-S50 to achieve segmented closed-loop control of the pole piece.

Preferable embodiments are described above, and the disclosure is not limited to the embodiments, and those skilled in the art may make a variety of equivalent transformations or substitutions without contravening the spirit of the disclosure, and these equivalent transformations or substitutions fall into scopes of the claims of the present application.

What is claimed is:

1. A laser drying device, comprising a laser drying module, a position sensor, a sensor module and a control system;

the laser drying module includes semiconductor laser units arranged in an array and electrically connected to the control system;

the sensor module includes a sensor and a sensor driving unit, wherein the sensor is slidably connected to the sensor driving unit, the sensor driving unit is positioned on a side of the laser drying module; the sensor of the sensor module is either a temperature sensor or a humidity sensor;

the position sensor is placed at an edge of a strip to detect a position of the edge of the strip;

wherein the sensor driving unit includes a sliding guide and a driving motor, the sliding guide is slidably connected to the sensor and placed on one side of the laser drying module, the driving motor is mounted on one end of the sliding guide and is kinetically connected to the sliding guide; and wherein the sliding guide includes a chain, a slide groove, a first transmission gear and a second transmission gear, the chain is arranged around the slide groove, and the chain is connected to the first transmission gear at an end and connected to the second transmission gear at the other end; a T-shape slider is provided at a connection point of the sliding guide and the sensor, and an horizontal end of the T-shape slider is arranged between the slide groove and a side of the chain away from the laser drying module; and the first transmission gear is kinetically connected to an output shaft of the drive motor.

2. The laser drying device of claim 1, wherein the laser drying module further includes a heat dissipation duct, laser cable ducts, a quartz glass plate and a housing, and wherein the heat dissipation duct is arranged on a surface of the housing distal to a coating, the quartz glass plate is arranged on a surface of the housing proximate to the coating, and the laser cable ducts are arranged around the heat dissipation duct.

3. The laser drying device of claim 2, wherein the semiconductor laser units are provided between the quartz glass plate and the housing.

4. A laser drying method applied to the laser drying device of any of claims 1-3, wherein the laser drying method comprises:

S10: establishing a coordinate system, and numbering each semiconductor laser unit of the laser drying module;

S20: establishing mapping relationships between each area of the pole piece and each semiconductor laser unit;

S30: collecting drying performance of different areas of the pole piece by the sensor module, and transmitting them to the control system;

S40: calculating difference between the drying performance of the different areas of the pole piece and the desired drying performance, and calculating the adjustment amount of the semiconductor laser unit for each area by a closed-loop control algorithm;

S50: seeking the number of the semiconductor laser unit in each area, via the control system, based on the mapping relationships between the different areas of the pole piece and the semiconductor laser units, and introducing the adjustment amount of the semiconductor laser unit for each area to the semiconductor laser unit with the number, to adjust output power of each semiconductor laser unit;

S60, repeating S30-S50 to achieve segmented closed-loop control of the pole piece.

5. The laser drying method of claim 4, wherein in S10, the numbering is performed by: taking an axis of the laser drying module as a starting point in an X direction, and taking an upper edge or a lower edge of the laser drying module as a starting point in a Y direction for numbering each semiconductor laser unit.

6. The laser drying method of claim 5, wherein in S20, establishing the mapping relationships by: establishing a right-angle coordinate system with an axis of the pole piece as X-axis, and with an upper edge or a lower edge of the pole piece as Y-axis, and inputting width ranges of each area of the pole piece; in the case that the axis of the pole piece is aligned with a normal of an emitting area of the laser drying module, obtaining the mapping relationships between different areas of the pole piece and the semiconductor laser units based on dimensions of light spots of the semiconductor laser units and widths of different areas of the pole piece.

7. The laser drying method of claim 4, further comprises a step, before S40, of correcting the mapping relationships between each area of the pole piece and each semiconductor laser unit according to the offset of the pole piece measured by the position sensor.

8. The laser drying method of claim 4, wherein the closed-loop control algorithm is a closed-loop control algorithm of PID.

* * * * *